United States Patent [19]
Klee et al.

[11] Patent Number: 4,859,448
[45] Date of Patent: Aug. 22, 1989

[54] METHOD OF MANUFACTURING POWDERED BARIUM TITANATE

[75] Inventors: Mareike K. Klee, Hückelhofen/Brachelen; Hans-Wolfgang Brand, Aachen, both of Fed. Rep. of Germany

[73] Assignee: U.S. Philips Corporation, New York, N.Y.

[21] Appl. No.: 209,450

[22] Filed: Jun. 20, 1988

[30] Foreign Application Priority Data

Nov. 25, 1987 [DE] Fed. Rep. of Germany ....... 3739853

[51] Int. Cl.$^4$ .................... C01G 23/00; G01F 11/02
[52] U.S. Cl. .................................... 423/598; 501/137
[58] Field of Search ............... 501/137; 423/598, 635, 423/610

[56] References Cited

U.S. PATENT DOCUMENTS

| | | | |
|---|---|---|---|
| 2,218,655 | 10/1940 | Peterson | 423/598 |
| 3,413,083 | 11/1968 | Daendliker | 423/598 |
| 4,636,378 | 1/1987 | Pastor et al. | 501/137 |
| 4,764,493 | 8/1988 | Lilley et al. | 423/598 |

FOREIGN PATENT DOCUMENTS

| | | | |
|---|---|---|---|
| 0104002 | 3/1984 | European Pat. Off. | 423/598 |
| 530584 | 12/1940 | United Kingdom | 423/598 |
| 715762 | 9/1954 | United Kingdom | 423/598 |

Primary Examiner—Robert L. Stoll
Attorney, Agent, or Firm—Norman N. Spain

[57] ABSTRACT

A method of manufacturing powdered barium titanate, in which titanium dioxide is made to react with barium hydroxide, excluding $CO_2$ at a temperature in the range from 60° to 95° C., amorphous titanium dioxide having a water content of $\approx 0.5$ mol. being made to react with excess barium hydroxide in water, and being dried after removing the excess barium ions.

4 Claims, 1 Drawing Sheet

METHOD OF MANUFACTURING POWDERED BARIUM TITANATE

BACKGROUND OF THE INVENTION

The invention relates to a method of manufacturing powdered barium titanate, in which titanium dioxide is made to react with barium hydroxide at a temperature in the range from 60° to 95° C. while excluding $CO_2$.

Ceramic powders having the Perowskite structure such as, for example, barium titanate powders, are an important starting material for the manufacture of widely differing electronic components such as, for example, multilayer capacitors or non-linear resistors having a positive temperature characteristic. The demand for ever improving electronic components as well as an improved process control in the manufacture of said components imposes high requirements on the starting materials. In particular, fine powder particles having a round shape and a narrow-range particle size distribution are in demand. Moreover, the starting materials must be of a high purity. Besides, if large-scale manufacturing is to be economical, the methods used for the manufacture of the $BaTiO_3$ powders must be inexpensive and must be carried out in a short period of time.

Barium titanate powders are produced by widely differing methods which, however, all have certain disadvantages, in particular, as regards purity, particle size and particle size distribution.

Barium titanate powders can for example be manufactured according to the so-called mixed-oxide method. In this method, barium carbonate and titanium dioxide are mixed in a grinding process and converted into barium-titanate at high temperatures of about 1000° C. A disadvantage is, that in the necessary grinding processes the relevant powder is contaminated in an undesired manner by abrasion. A further disadvantage is that high calcining temperatures are required, causing large aggregated $BaTiO_3$ powder particles having an irregular shape and a wide-range particle size distribution to be formed. The resultant particles must be reduced in size after the calcining process in a grinding process in which, however, particle sizes <1 $\mu$m cannot be attained. Moreover, the calcining process involves a high energy consumption.

Further, it is known from, for example, J. Am. Cer. Soc. 48 (1965), p. 644 ff. to manufacture barium-titanate powder by pyrolysis of precipitates, for example barium titanyl oxalates. Due to the precipitation this method leads to a powder of a higher purity than that obtained with the mixed-oxide method, however, it also requires reaction temperatures of approximately 1000° C. The powder aggregates formed in this process must also be reduced in size by a grinding process.

Fine highly pure barium-titanate powder having a particle diameter in the range from 0.005 to 0.03 $\mu$m can be manufactured according to known methods by precipitation at low temperatures in the range from 20° to 90° C.: These metals involve 1. Hydrolysis of barium titanium alcoholates with $H_2O$ (J. Am. Cer. Soc. 54 (1971), pp. 548–553), or
2. Hydrolysis of titanium alcoholates in an aqueous $Ba(OH)_2$ solution (J. Am. Cer. Soc. 49 (1966), pp.291–295).

Both of these known methods are very costly and time-consuming. To avoid decomposition of the alcoholates to $BaCO_3$, $TiO_2$ or $Ba(OH)_2$ the operation must be carried out in an atmosphere which is free of $H_2O$, $CO_2$ and $O_2$.

If the reaction temperature, the concentration and the precipitation rate is not carefully controlled, undesired deviations from the morphology and the stoichiometry of the barium-titanate powder take place.

Barium-titanate powder can further be obtained by a hydrothermal reaction. By means of this method which is known from, for example, German patent application No. DE 3526674 fine barium titanate powder can be manufactured by using hydroxides, halogenides or alcoholates at temperatures in the range from 150° to 200° C. and pressures between 5 and 15 bar. The cost of this known method is relatively high because the reaction must take place in autoclaves and certain safety precautions have to be taken. A further disadvantage may be that the barium-titanate powder can only be produced batchwise instead of in a continuous process.

From EP-A 141551 a method of manufacturing alkaline earth metal titanate powders is known, in which titanium oxide is made to react with barium hydroxide at a reaction temperature in the range of from 60° to 110° C. Preferably, orthotitanium acid having a high water content is used as titanium oxide, this acid is obtained by a reaction of a titanium salt such as a chloride, sulfate or oxalate with alkalis. Orthotitanium acid contains at least 2 mol. of water. However, metatitanium acid having a water content of 1 mol. or titanium dioxide, obtained by heating orthotitanium acid, may alternatively be used.

A disadvantage of this method is that the starting compounds (chlorides, sulphates, oxalates, alkalis) used contaminate the end product to be manufactured. Perovskite-phase powders which are to be used for the manufacture of electronic components must be very pure. If orthotitanium acid is heated to produce titanium dioxide, there is the problem that the titanium dioxide crystallizes and, hence, exhibits a reduced reactivity in subsequent process steps. Moreover, a further problem is that, due to the heating of the orthotitanium acid and the consequential crystallization process, undesired impurities such as alkali ions, chloride ions, sulphate ions, oxalate ions may be introduced into the crystal lattice, which impurities cannot be removed in subsequent purification processes.

SUMMARY OF THE INVENTION

It is an object of the invention to provide a method of manufacturing pure barium titanate powder having a substantially round particle shape which powder has a reduced sintering interval relative to the known barium titanate powders and, hence, an improved sinterability, which exhibits an improved reactivity with additives which are added to ceramic masses on the basis of barium titanate to obtain a sintering product with desired technical properties, and which is obtained having a suitable particle size and particle-size distribution, so that grinding processes are superfluous.

This object is achieved in accordance with the invention, in that amorphous titanium dioxide having a water content of $\approx 0.5$ mol. is made to react with an excess amount of barium hydroxide in water, and removing excess barium ions and then drying the product.

Figure 1:
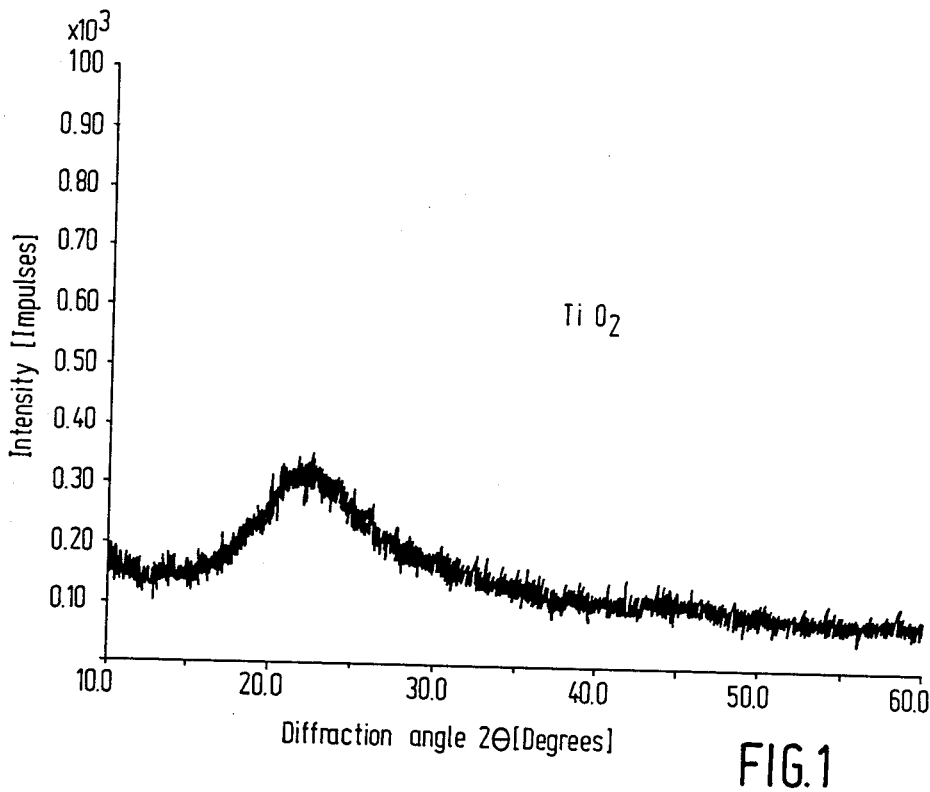
FIG. 1 is a X-ray defraction diagram of undried amorphous titanium dioxide employed as a starting material for production of barium titanate according to the method of the invention.

In accordance with an advantageous further embodiment of the method according to the invention, Ba(OH$_2$).8H$_2$O is used as barium hydroxide.

In accordance with a further advantageous embodiment of the inventive method, a titanium alcoholate solution is made to react with deionized water in order to manufacture amorphous titanium dioxide, the washed reaction product is separated from the washing solution and subjected to the subsequent process step in an undried condition. Titanium tetraethoxide which is dissolved in m-xylol is advantageously used as a solution of or titanium alcoholate.

The invention is based on the recognition that to obtain, in a reproducible manner, a barium titanate powder having a predetermined particle size within a narrow particle size range more than only stable starting materials are required; with respect to the reaction of the components (titanium dioxide and barium hydroxide) used to manufacture the barium-titanate powder it has been found that a mol. ratio Ba:Ti=1:1 can be accurately reproduced, since in this way the solution of in particular the barium ions is reduced.

The method according to the invention has the following advantages: at relatively low reaction temperatures in the range from 60° to 95° C. and at atmospheric pressure a fine-grained, crystalline barium titanate powder having a particle size in the range from 0.01 to 0.5 $\mu$m is obtained which does not have to be subjected to a further grinding process. Consequently, in the method according to the invention high reaction temperatures and grinding processes leading to impurification are advantageously avoided. Moreover, the method according to the invention enables barium titanate powders having a well-defined particle size and morphology to be manufactured without a costly process control.

Unlike known precipitation processes, in the known method no hydrolysis of barium alcoholates or titanium alcoholates to form BaTiO$_3$ takes place. This means that the present method is less costly and less time-consuming as regards the preparation, because it is not necessary to operate in an atmosphere which is free from H$_2$O and O$_2$.

In the known precipitation methods it is necessary to operate in an atmosphere which is free from H$_2$O and O$_2$ to avoid heterogeneous nuclei from being formed in the starting solution due to a premature hydrolysis of the barium alcoholates or titanium alcoholates, which heterogeneous nuclei bring about an uncontrolled formation and growth of nuclei during precipitation. This results in the formation of a barium-titanate powder whose particle size is difficult to control. In the method according to the invention, the particle size of the barium-titanate powder can be adjusted in a wide range and controlled right from the start due to the selection of the process parameters, reaction duration and reaction temperature; consequently, barium-titanate powders of a defined particle size can be manufactured in a reproducible manner.

As compared to the hydrothermal process, the present method has the advantage that the reaction for forming barium titanate can be carried out without increasing the pressure. By operating under normal pressure a continuous process becomes possible, whereas when reactions are carried out at an increased pressure only batchwise production is possible. Since it is a continuous process, a substantial cost reduction can be obtained because the processing device does not run idle any more, the size of the device can be selected in accordance with the requirements, and the process can be controlled continuously.

Figure 2:
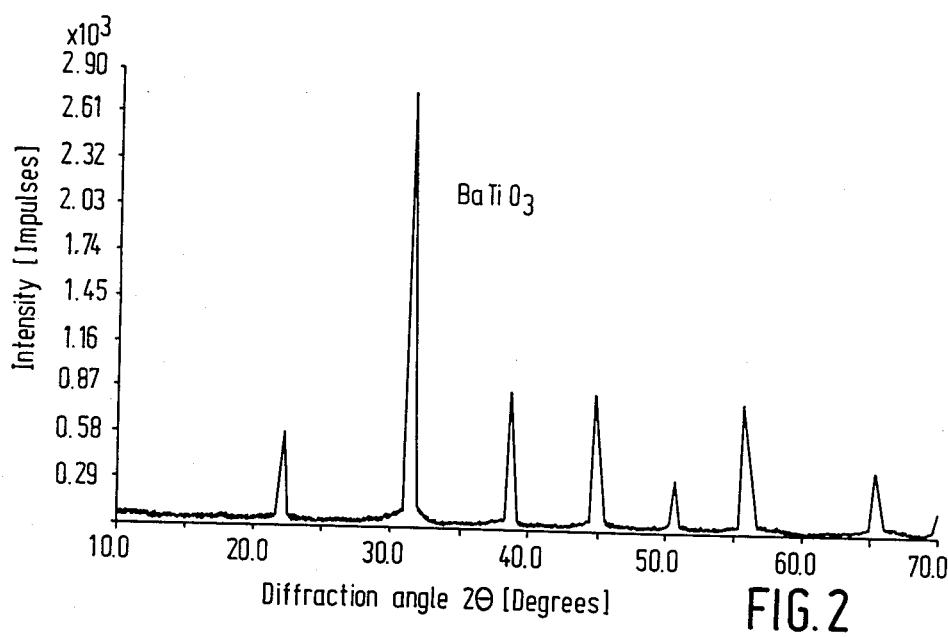
FIG. 2 is a pattern of an X-ray defraction diagram of barium titanate manufactured according to the method of the invention.

The invention will now be explained in greater detail by means of an example and with reference to the drawings, in which FIG. 1 is an X-ray diffraction diagram of undried, amorphous titanium dioxide which is used as a starting material for the manufacture of barium titanate in the method according to the invention, FIG. 2, is an X-ray diffraction diagram of barium titanate manufactured in accordance with the present method.

In accordance with the method, of the invention barium titanate powder is produced as follows: amorphous titanium dioxide having a water content of $\approx 0.5$ mol. is converted with excess barium hydroxide, preferably Ba(OH)$_2$.8H$_2$O in water at a temperature of $\approx 95°$ C., while excluding CO$_2$.

1. Manufacture of amorphous titanium dioxide.

Titanium dioxide having a water content of $\approx 0.5$ mol. is obtained by reacting titanium tetraethoxide with H$_2$O in the following manner. In a round flask having a capacity of 1000 cm$^3$, 0.24 mol. of titanium tetraethoxide are dissolved in 450 ml. of m-xylol (p.a.). The 0.48M titanium alcoholate solution is stirred vigorously. 43.2 ml. of deionised water from a 50 ml. dropping funnel are introduced dropwise into the titanium alcoholate solution within a period of 60 minutes. The precipitate obtained is removed by centrifuging and to remove residual xylol from the particle surface, it is washed with ethanol. To this end the centrifugate is dispersed in 500 ml. of ethanol (denatured) in an ultrasonic bath for 30 minutes, after which it is separated from the washing solution by centrifuging. This process is repeated.

The titanium dioxide powder produced in this way is X-ray amorphous; see FIG. 1. The wide maximum at a diffraction angle $2\theta \approx 22°$ results from residual solvent adhering to the powder surface.

In accordance with the above-described method, a fine titanium-dioxide powder having an average particle diameter of 0.2 $\mu$m, a round particle shape and a water content of $\approx 0.5$ mol. is obtained.

The centrifugate obtained as described above is used undried in the subsequent reaction. Due to the fineness of the powder, the centrifugate contains large quantities of solvent. The TiO$_2$ content of the centrifugate is determined gravimetrically and amounts to 0.152 g. per gram of centrifugate.

2. Manufacture of barium-titanate.

3.7162 g. of the centrifugate formed, which contains 0.5649 g. of TiO$_2$ and the remainder is ethanol, are weighted out with 4.4711 g. of Ba(OH)$_2$.8H$_2$O in a 10 ml.-Woulfe's bottle of a material which is relatively in particular to alkalis. In a N$_2$ atmosphere 25 ml. of CO$_2$-free redistilled water are added to the powder mixture. The suspension obtained is made to boil while stirring and is made to react while refluxing at the boiling temperature. To homogenize the suspension, the reaction is carried out under continuous stirring by means of a magnetic stirrer. After a reaction time of 91 hours the powder obtained is removed from the parent solution suspension by pressure filtration using N$_2$ as a pressure gas. Cellulose acetate filters having a pore size of 0.2 μm are used as filters.

To remove the excess $Ba(OH)_2.8H_2O$, the powder obtained is washed several times with 50 ml. of deionised boiling water and once with 25 ml of 1M aqueous acetic acid. The complete removal of the excess barium ions is verified by the precipitation of $BaSo_4$ from the washing water. The acetic acid adhering to the powder surface as well as the water are removed by washing the powder, first three times with 75 ml of deionised boiling water and then three times with 10 ml of ethanol (denatured). For further analysis, the product obtained is dried in a drying chamber at a temperature of 120° C. for 60 minutes.

The X-ray diffraction diagram of the powder obtained according to the above-described reaction conditions (FIG. 2) shows no phases other than barium-titanate. In accordance with the small particle size, the barium-titanate powder has a cubic to pseudo-cubic structure.

By SEM (scanning electron microscopy) investigations, at a magnification of 40 000, the presence of fine barium titanate powder having a round particle shape and an average particle diameter of approximately 0.086 μm was demonstrated. The barium titanate powder manufactured according to the present method has a stoichiometric composition.

What is claimed is:

1. A method of manufacturing powdered barium titanate powder, said method comprising the steps:
   (a) refluxing at a temperature of between 70° C.–95° C. an aqueous suspension of an amorphous titanium dioxide power having a bound water content of ≃0.5 mol and barium hydroxide in excess while excluding $CO_2$ to thereby form barium titanate,
   (b) removing barium titanate powder from the suspension,
   (c) removing excess barium ions from the barium titanate power and,
   (d) then drying the barium titanate powder.

2. A method of claim 1 wherein the amorphous titanium dioxide powder is manufactured by hydrolyzing a titanium alcoholate by adding deionized water to a solution of a titanium alcholate to thereby precipitate out an amorphous titanium dioxide power having a bound water content of ≃0.5 mol, separating said titanium dioxide powder from said solution, washing said titanium dioxide powder with a washing solution, separating the washing solution from said titanium dioxide powder and, without drying, employing said titanium dioxide powder in said method.

3. The method of claim 1 wherein $Ba(OH)_2.8H_2O$ is used as the supply of the barium hydroxide.

4. The method of claim 2 wherein the solution of the titanium alcoholate is a solution of titanium tetraethoxide in m-xylol.

* * * * *